United States Patent
Ayuba et al.

(10) Patent No.: US 11,630,873 B2
(45) Date of Patent: Apr. 18, 2023

(54) AUTOMATIC SEARCH QUERY FOR UNKNOWN VERBAL COMMUNICATIONS

(71) Applicant: International Business Machines Corporation, Armonk, NY (US)

(72) Inventors: Sho Ayuba, Tokyo (JP); Yoshio Horiuchi, Hiratsuka (JP); Masashi Doi, Aoba-Ku (JP); Timothy Waileong Koh, Chuo-Ku (JP)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 17/110,361

(22) Filed: Dec. 3, 2020

(65) Prior Publication Data

US 2022/0179917 A1    Jun. 9, 2022

(51) Int. Cl.
| | | |
|---|---|---|
| *G06F 16/00* | (2019.01) | |
| *G06F 16/9532* | (2019.01) | |
| *G10L 15/26* | (2006.01) | |
| *G06F 16/9536* | (2019.01) | |
| *G06F 16/9537* | (2019.01) | |
| *G06F 3/0482* | (2013.01) | |

(52) U.S. Cl.
CPC ........ *G06F 16/9532* (2019.01); *G06F 3/0482* (2013.01); *G06F 16/9536* (2019.01); *G06F 16/9537* (2019.01); *G10L 15/26* (2013.01)

(58) Field of Classification Search
CPC ............. G06F 16/9532; G06F 16/9537; G06F 16/9536; G06F 3/0482; G10L 15/26
See application file for complete search history.

(56) References Cited

U.S. PATENT DOCUMENTS

| 10,896,295 | B1* | 1/2021 | Shenoy ................ G10L 15/187 |
|---|---|---|---|
| 2009/0066722 | A1 | 3/2009 | Kriger |
| 2016/0378850 | A1 | 12/2016 | Priel |
| 2017/0039874 | A1 | 2/2017 | Peterson |
| 2017/0169816 | A1 | 6/2017 | Blandin |

FOREIGN PATENT DOCUMENTS

| JP | 2013250931 A | 12/2013 |
|---|---|---|
| JP | 2019101754 A | 6/2019 |
| JP | 2019121075 A | 7/2019 |

\* cited by examiner

*Primary Examiner* — Hung Q Pham
(74) *Attorney, Agent, or Firm* — Erika R. DeCosty (57) ABSTRACT

A computer-implemented method for generating information associated with unknown verbal communications is disclosed. The computer-implemented method includes receiving a user indication of an unknown verbal communication. The computer-implemented method further includes displaying a potential unknown word list to the user, wherein the potential unknown word list includes words corresponding to verbal communications that occurred prior to receiving the user indication of the unknown verbal communication. The computer-implemented method further includes identifying that a word is selected from the potential unknown word list. The computer-implemented method further includes generating, in response to identifying that the word is selected from the potential unknown word list, additional information associated with the selected word.

19 Claims, 8 Drawing Sheets

AUTOMATIC SEARCH QUERY FOR UNKNOWN VERBAL COMMUNICATIONS

BACKGROUND

The present invention relates generally to the field of search queries, and more particularly to search queries for information about unknown verbal communications.

A search query or web search query is a query based on a specific search word or term used to satisfy an information need. Typically, search queries are web based, in which the search term is entered into a web search engine through the use of a user interface of an electronic device such as a computer, hand-held mobile device, or smart appliance. A web search engine or Internet search engine is a software system designed to search for particular information specified in web search query. The search results are generally presented in a line of results, often referred to as search engine results pages (SERPs). The information may be a mix of links to web pages, images, videos, infographics, articles, and other types of files or information. In addition to searching for information on the Internet, some search engines may also mine data available in databases or open directories. For example, based on a user entering a particular search term into a search engine, a search query is generated, in which the search engine scrapes (i.e., extracts data from web sources) or mines (analyzes data stored in databases) to obtain relevant information to the search query.

SUMMARY

According to one embodiment of the present invention, a computer-implemented method for generating information associated with unknown verbal communications is disclosed. The computer-implemented method includes receiving a user indication of an unknown verbal communication. The computer-implemented method further includes displaying a potential unknown word list to the user, wherein the potential unknown word list includes words corresponding to verbal communications that occurred prior to receiving the user indication of the unknown verbal communication. The computer-implemented method further includes identifying that a word is selected from the potential unknown word list. The computer-implemented method further includes generating, in response to identifying that the word is selected from the potential unknown word list, additional information associated with the selected word.

According to another embodiment of the present invention, a computer program product for generating information associated with unknown verbal communications is disclosed. The computer program product includes one or more computer readable storage media and program instructions stored on the one or more computer readable storage media. The program instructions include instructions to receive a user indication of an unknown verbal communication. The program instructions further include instructions to display a potential unknown word list to the user, wherein the potential unknown word list includes words corresponding to verbal communications that occurred prior to receiving the user indication of the unknown verbal communication. The program instructions further include instructions to identify that a word is selected from the potential unknown word list. The program instructions further include instructions to generate, in response to identifying that the word is selected from the potential unknown word list, additional information associated with the selected word.

According to another embodiment of the present invention, a computer system for generating information associated with unknown verbal communications is disclosed. The computer system includes one or more computer processors, one or more computer readable storage media, and program instructions stored on the computer readable storage media for execution by at least one of the one or more computer processors. The program instructions include instructions to receive a user indication of an unknown verbal communication. The program instructions further include instructions to display a potential unknown word list to the user, wherein the potential unknown word list includes words corresponding to verbal communications that occurred prior to receiving the user indication of the unknown verbal communication. The program instructions further include instructions to identify that a word is selected from the potential unknown word list. The program instructions further include instructions to generate, in response to identifying that the word is selected from the potential unknown word list, additional information associated with the selected word.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of search queries, and more particularly to search queries for information related to unknown verbal communications.

Oftentimes, an individual may come across an unfamiliar term, concept, or abbreviation during a presentation or meeting. In such instances, an individual can take several different measures in order to obtain information related to the unfamiliar term or concept. In one instance, an individual can attempt to search for information related to such unknown term or concept. For example, a user can enter the unknown term or concept into a search engine on their mobile device. However, embodiments of the present invention recognize that by taking the time to input the search term(s) and sift through the search results to ultimately derive a meaningful answer may detract from the individual's ability to follow along with the presentation or meeting. Additionally, embodiments of the present recognize that an individual may have simply missed one or more words communicated during a presentation or may be unsure as to how to spell a particular term(s). In these scenarios, one may not even be able to search for information related to the unknown term or concept and must either result to other measures to obtain said information or simply forego obtaining said information altogether.

In another instance, an individual may choose to interrupt the speaker to explain an unknown term or concept. However, embodiments of the present invention recognize that interrupting the speaker can disrupt the flow of the presentation or meeting. For example, the unknown term or concept may generally be understood by a majority of the audience, and thus having the presenter take time out of the meeting to explain the unknown term or concept for a minority of the audience may be seen as a waste of time. On the other hand, a majority of the audience may not understand a particular term or concept, but may be reluctant or embarrassed to interrupt the presenter.

In yet another instance, an individual may choose to wait until the end of the presentation or meeting to ask for clarification or additional information related to an unknown term or concept. However, embodiments of the present invention recognize that by waiting until the end of the presentation to personally search for or ask the presenter for information related to the unknown term or concept may result in the inability of the user to comprehend future parts of the presentation.

Embodiments of the present invention improve upon the foregoing deficiencies of obtaining information related to verbal communications by automatically generating information related to an unknown term or concept without requiring an individual to manually perform a search or interrupt a presenter. According to embodiments of the present invention, a word list containing potential unknown words that were previously verbally communicated within a time period prior to receiving a user indication of an unknown verbal communication is populated on a user device of a user. The user is then able to select one of the potential unknown words, in which selection of a particular word results in additional information associated with the unknown or unfamiliar word. In an embodiment, if the word list does not contain the desired unknown word or term, the user may request an additional list of words. For example, an additional sets of words are retrieved that extends beyond those words verbally communicated within the time period prior to receiving the user indication of the unknown term.

Accordingly, by automatically generating potential unknown words communicated prior to receiving a user indication of an unknown term or concept, an individual may obtain information related to verbal communications without knowing how to spell or even having heard a particular word. Furthermore, by automatically generating potential unknown words communicated prior to receiving a user indication of an unknown term or concept, a user may obtain information related to an unknown word without being distracted from the presentation by carrying out a search query or interrupting the speaker.

Moreover, embodiments of the present invention provide for streaming unknown words and/or related information to a shared user space located on respective user devices of those individuals participating in a conference or meeting. In an embodiment, if a threshold number of users indicate a request for an unknown term or concept, the unknown term or concept is automatically streamed to a shared space of a graphical user interface of each respective user device for all members of the presentation or meeting. In an embodiment, selection of a particular term or concept streamed to the shared space of the graphical user interface by a threshold number of users results in automatically streaming additional information to the shared space of each respective user device for all members of the presentation or meeting. In an embodiment, if a term or concept is streamed to the shared space and/or a threshold number of users select the term or concept in the shared space, the presenter is notified, and further actions are recommended to the presenter. In an embodiment, if a term or concept is streamed to the shared space and/or a threshold number of users select the word streamed to the shared space, information related to the selected unknown term or concept is automatically updated on a presentation display (e.g., PowerPoint) associated with the event. In an embodiment, if a term or concept is streamed to the shared space and/or a threshold number of user select the word streamed to the shared space, the selected unknown term or concept is automatically replaced with a synonym associated with the unknown term or concept.

Accordingly, embodiments of the present invention further provide improvements to the aforementioned deficiencies of obtaining information related to verbal communications by proactively streaming potential unknown words or concepts that were verbally communicated, and information related thereof, to a shared space on each of a plurality of user devices of a meeting since it is likely that if many individuals are unfamiliar with something, most individuals will likely be unfamiliar as well.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
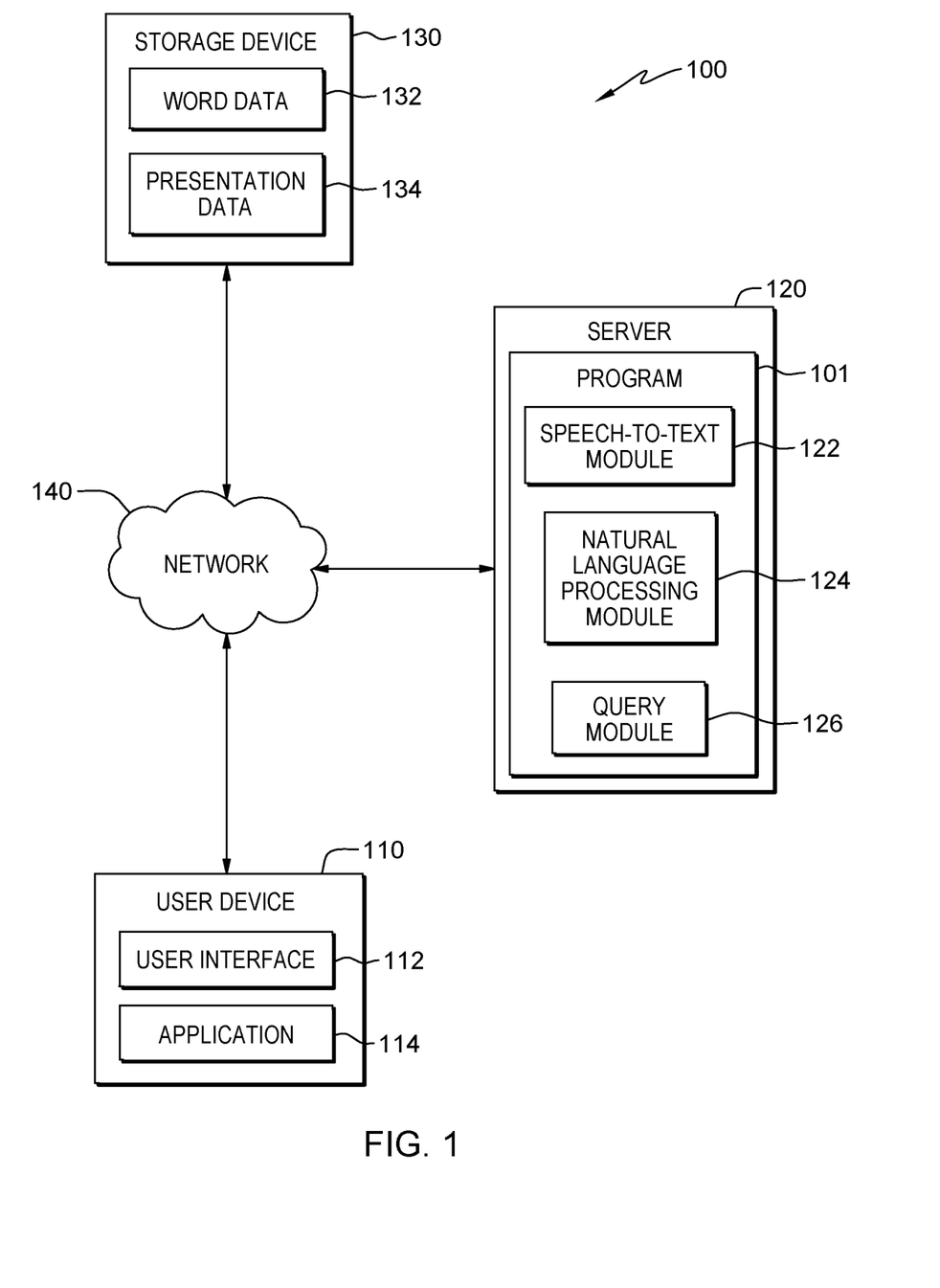
FIG. 1 is a functional block diagram of a computing system, generally designated 100, for generating information related to unknown verbal communications in accordance with at least one embodiment of the present invention.

The present invention will now be described in detail with reference to the Figures. FIG. 1 is a functional block diagram of a computing system, generally designated 100, for generating word information related to unknown verbal communications in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Computing system 100 includes user device 110, server 120, and storage device 130 interconnected over network 140. User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on user device 110. In various example embodiments, application 114 can be an application that a user of user device 110 utilizes to request and view words associated with unknown verbal communications and select words associated with unknown verbal communications for additional information via user interface 112. In other embodiments, application 114 can be another mobile device application (e.g., a web browser, enterprise-specific messaging application, social media application, etc.). For example, application 114 is a client-side application associated with server 120 (e.g., a client-side application associated with information program 101).

In an additional embodiment, application 114 can operate to perform processing steps of information program 101 (i.e., application 114 can be representative of information program 101 operating on user device 110), in accordance with various embodiments of the present invention. For example, a user of user device 110 can request a word list utilizing application 114 and view a word list on user device 110 (e.g., via user interface 112). In an embodiment, a user can request an additional word list utilizing application 114 should an original word list not contain one or more words corresponding to an unknown verbal communication. In an embodiment, user device 110 can be in intermittent communication with information program 101 residing on server 120. For example, user device 110 can request a word list or additional information associated with a word list corresponding to verbal communications (e.g., while not connected to network 140) and then communicate the request to information program 101 at a later time (e.g., when capable of connecting to network 140).

In example embodiments, server 120 can be a desktop computer, a computer server, or any other computer systems, known in the art. In certain embodiments, server 120 represents computer systems utilizing clustered computers and components (e.g., database server computers, application server computers, etc.) that act as a single pool of seamless resources when accessed by components of computing environment 100 (e.g., user device 110, storage system 130, and other devices not shown). In general, server 120 is representative of any electronic device or combination of electronic devices capable of executing computer readable program instructions. Server 120 may include components as depicted and described in further detail with respect to FIG. 8, in accordance with embodiments of the present invention.

Server 120 includes information program 101, which further includes, speech-to-text module 122, natural language processing module 124, and query module 126. In an embodiment, speech-to-text module 122 is a component or sub-program of information program 101 that converts speech into text. For example, speech-to-text module 122 converts the spoken words of a speaker at a conference or meeting to text in real time using one or more speech-to-text systems generally known in the art. In an embodiment, information program 101 stores the converted words as word data 132 in storage device 130. One of ordinary skill in the art will appreciate that information program 101 can convert any verbal communication made during a presentation, meeting, or conference to text. For example, this may include, but is not limited to, verbal communications from other audience members, co-presenters, as well as audio and video included in any presentation materials.

In an embodiment, the text is converted into a Unicode format (i.e., a universal encoding standard used for representing text for computer processing). In an embodiment, the text is converted into a speech synthesis mark-up language (SSML) format. In an embodiment, the raw text containing symbols (e.g., numbers and abbreviations) is converted into the equivalent of written-out words through text normalization (i.e., pre-processing or tokenization).

Natural language processing (NPL) module 124 is a component or sub-program of information program 101 used to analyze information about word data 132 stored in storage device 130. Natural language processing is a sub-field of linguistics, computer science, and artificial intelligence for processing natural language data. In various embodiments, natural language processing module 124 separates speech into words, for example, through the use of word segmentation or tokenization. Word segmentation is the separation of continuous text into words. For example, as a presenter is speaking, speech converted into text is separated into individual words. Tokenization is the process of breaking up and classifying sections of a string of input characters. For example, as a presenter is speaking, the raw words are broken up into words, sentences, or phrases. In various embodiments, information program 101 stores the individual words and individual sentences as word data 132 in storage device 130.

In an embodiment natural language processing module 124 performs part-of-speech tagging on word data 132. Part-of-speech tagging (i.e., grammatical tagging) is the process of marking up a word in a text as corresponding to a particular part of speech, based on both its definition and its context. For example, natural language processing module 124 can tag individual words as a noun, verb, adjective, etc. based on the definition of the words and the context in which the words are used during a presentation. Information program 101 stores any part of speech tagging as word data 132 in storage device.

Query module 126 is a component or sub-program of information program 101 that generates search queries. In various embodiments, information program 101 receives unknown words selected by a user and automatically generates a search query based on the selected unknown word(s) to retrieve additional information about the selected unknown word(s). In an embodiment, query module 126 performs a web-based search query in which information is retrieved from a web search engine. In an embodiment, information program 101 automatically generates a search query based on the selected unknown word(s) to retrieve additional information about the selected unknown word(s) from storage device 130. For example, a presenter can upload presentation materials, such as PowerPoints, audio and video data, and additional information corresponding thereto to storage device 130. In some embodiments, as new word data is generated, query module 126 automatically retrieves additional information associated with a word in real time. In other embodiments, query module 126 does not generate a search query until an unknown word is selected by the user.

Server 120 utilizes storage device 130 to store and retrieve various information, including word data 132, such as text-based words converted from verbal communications during a presentation or meeting and additional information related thereof, and presentation data 134, such as image, audio, and video data presented during a presentation or meeting. Storage device 130 can be implemented with any type of storage device which is capable of storing data that may be accessed and utilized by server 120 and user device 110, such as a database server, a hard disk drive, or a flash memory. In an embodiment, storage device 130 can represent multiple storage devices and collections of data within server 120.

In example embodiments, information program 101 generates potential unknown word lists in accordance with embodiments of the present invention. In some embodiments, information program 101 automatically generates a search query for any potential unknown words, phrases, or acronyms included in a potential unknown word list. In other embodiments, information program 101 generates a search query for any potential unknown words, phrases, or acronyms included in a potential unknown word list after a user selection from the potential unknown word list is made. In some embodiments, the results of the search query are stored in an index in storage device 130 as word data 132. In some embodiments, the index comprises words, phrases, or acronyms with their respective meaning or additional information. In an embodiment, a list of potential unknown words corresponding to verbal communications made during a presentation or meeting are filtered to include only those words having a particular part(s) of speech, such as verbs, nouns, or acronyms. This will ultimately reduce the number of words a user is presented with, since a user will likely not be unfamiliar with words associated with certain parts of speech, such as pronouns, conjunctions, adjectives, etc. In this embodiment, information program 101 retrieves words, phrases, or acronyms from word data 132 when a user indicates they are unfamiliar with a word, phrase, or acronym and displays said words, phrases, or acronyms with their respective meaning or additional corresponding information.

In embodiments in which presentation data 134 is part of the presentation (e.g., uploaded by the presenter ahead of time or displayed in conjunction with the presentation), information program 101 may further compare the presentation material currently being presented with the verbal communications made by the presenter to determine which words corresponding to particular verbal communications a user is likely unfamiliar with. For example, if when an indication of an unknown word is received and Slide 5 is displayed to the audience, information program 101 will compare words on Slide 5 to the verbal communications made by the presenter at the time the indication is received to determine which word(s) a user is likely unfamiliar with.

In various embodiments, a timestamp is generated when a user indication is received that a user is unfamiliar with a word, phrase, acronym, etc. For example, a user can select a button from application 114 via user interface 112 to indicate they do not understand a particular verbal communication. Thus, if a user transmits an indication at 1:05:10 pm that the user is unfamiliar with a word spoken by the presenter, information program 101 generates a timestamp for 1:05:10 pm.

In various embodiments, information program 101 generates word lists of potential unknown words from word data 132 stored in storage device 130. In an embodiment, information program 101 generates a potential unknown word list from verbal communications made within a predetermined set of time prior to the time at which the indication of an unknown or unfamiliar word is received. For example, information program 101 may retrieve any number of words verbally spoken up to 15 seconds prior to the generated timestamp corresponding to the user indication of an unknown word. In an embodiment, information program 101 generates a potential unknown word list from a predetermined number of verbal communications made prior to the time at which the indication of an unknown or unfamiliar word is received. For example, information program 101 may retrieve the last 5 words verbally spoken prior to the generated timestamp corresponding to the user indication of an unknown word.

In various embodiments, information program 101 displays the potential unknown words via a word list on user device 110. Upon user selection of an unknown word from the potential unknown words, information program 101 generates a search query based on the selected unknown word to retrieve additional information about the selected unknown word.

In some embodiments, information program 101 orders the potential unknown words included in a word list based on a degree or likelihood of unfamiliarity of a word with respect to a given individual. The likelihood of unfamiliarity relates to the probability or likelihood a potential unknown word generated by information program 101 is the unknown word the user is seeking information on. In an embodiment, words that receive a high likelihood of unfamiliarity (e.g., at and/or above a predetermined threshold) will be shown at the top of the potential word list generated for the user. Similarly, words that receive a low degree of unfamiliarity (e.g., at and/or below a predetermined threshold) will be shown at the bottom of the potential word list. In an embodiment, the likelihood of unfamiliarity for a potential unknown word is based, at least in part, on the number of times other users selected the same potential unknown word. For example, a potential unknown word which has already been selected by other users will increase its likelihood of unfamiliarity. In an embodiment, the likelihood of familiarity is based, at least in part, on comparing verbal communications made by an individual to presentation materials displayed at the time the verbal communications are made. For example, information program 101 may compare word data 132 to presentation data 134. In an embodiment, words found in word data 132 that do not correspond to or are associated with the presentation data 134 will be given a higher likelihood of unfamiliarity. For example, if a word is spoken verbally by the presenter but is not found within the presentation materials, there is a higher probability a user is unfamiliar with the word. Similarly, words found in word data 132 that do correspond to or are associated with the presentation data 134 will be given a lower likelihood of unfamiliarity.

In some embodiments, a generated word list may not include the particular unknown word the user is looking for. In an embodiment, the user can indicate their unknown word is not displayed by requesting more words or an additional word list. In these embodiments, information program 101 retrieves additional potential unknown words from word data 132. For example, information program 101 generates and displays an additional set of potential unknown words communicated within a second predetermined set of time prior to the time at which a user indication of an unknown word is generated. In another example, information program generates and displays a set of additional unknown words based on a second predetermined number of words communicated prior to the time at which a user indication of an unknown word is generated. In an embodiment, information program 101 can increase a timeout when a request to retrieve additional words is received. However, if a user does not select a word from the word list within a threshold amount of time, the word list is removed from the user's view. For example, once the word list is displayed to the user, a timeout is started, in which the word list is removed from a user's view if a word is not selected prior to the timeout being reached.

In various embodiments, if information program 101 detects that a number of users at and/or above a predetermined threshold select the same unknown word on their respective devices, the word is streamed in real time to a shared space located on the respective devices of those individuals participating in the event. In an embodiment, if information program 101 detects that a number of users at and/or above a predetermined threshold select the same unknown word from the shared streaming space, information program 101 streams additional information associated with the selected unknown word in real time to a shared user space located the respective devices of those individuals participating in the event. In an embodiment, if a number of users at and/or above a predetermined threshold select the same unknown word from the shared user space, information program 101 sends a notification to the presenter. In an embodiment, if information program 101 detects that a number of users at and/or above a predetermined threshold selected the same unknown word from the shared user space and the presenter has been notified, but determines that the presenter did not give a further explanation or additional information about the unknown word, information program 101 may prevent the presentation materials (e.g. PowerPoint) from advancing until a further explanation or additional information about the unknown word is detected.

Figure 2:
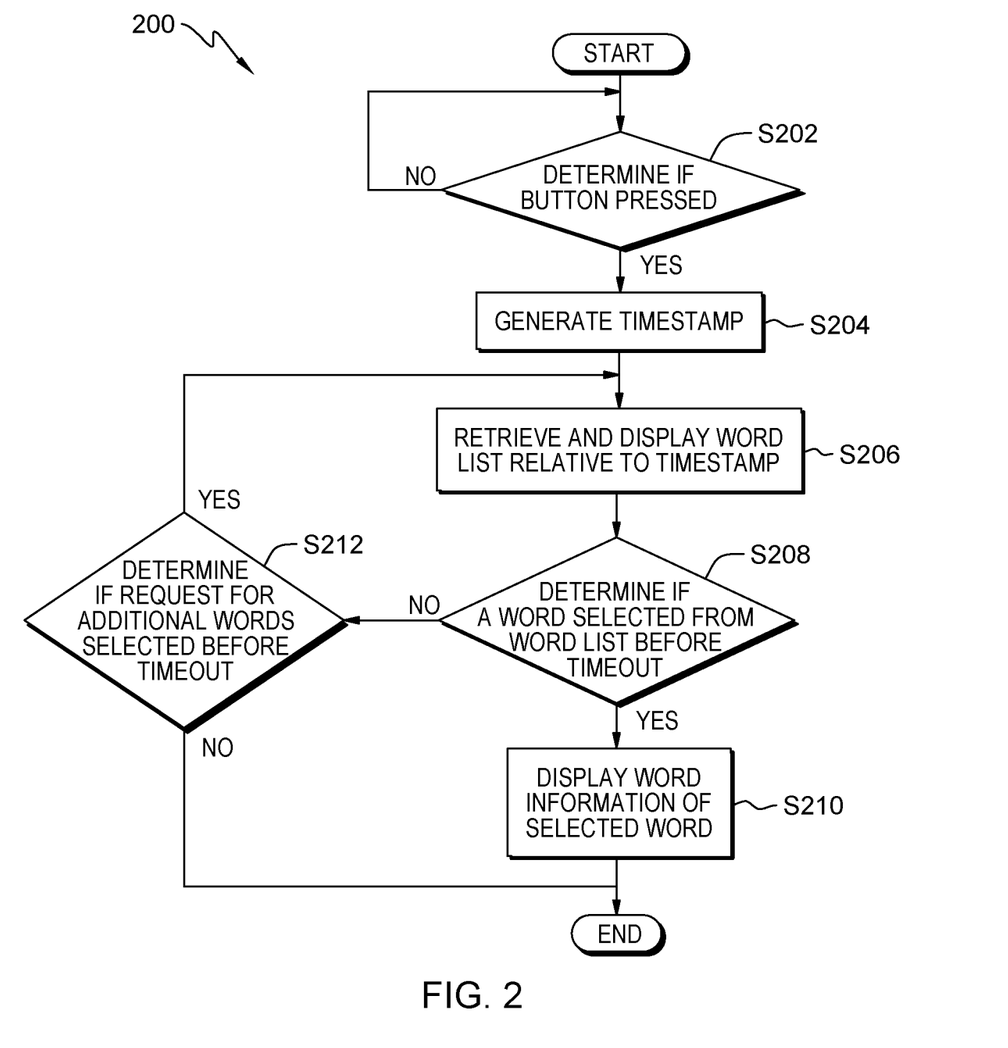
FIG. 2 is a flow chart diagram depicting operational steps for generating information related to unknown verbal communications on a user device in accordance with at least one embodiment of the present invention.

FIG. 2 is a flow chart diagram, generally designated 200, depicting operational steps for generating information related to unknown verbal communications on a user device in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At decision step S202, information program 101 determines whether an unknown verbal communication indication is received. Here, information program 101 determines if a request for a list of potential unknown words corresponding to recent verbal communications is received from a mobile device, such as user device 110. For example, a user can press a pre-designated button in application 114 to indicate that they do not understand a verbal communication. Similarly, a user can select the pre-designated button while simultaneously swiping across the screen when within application 114 to indicate that they do not understand a textually presented word (e.g., a word included in a PowerPoint slide). In another example, a user can enter a voice command when using application 114 to indicate that they do not understand a verbal communication. If it is determined that an unknown verbal communication indication was not received (decision step S202 "NO" branch), information program 101 returns to decision step S202. If it is determined that an unknown verbal communication indication was received (decision step S202 "YES" branch), information program 101 proceeds to step S204.

At step S204, responsive to determining that an unknown verbal communication indication is received, information program 101 generates a timestamp with respect to the time at which the indication of the unknown verbal communication was generated.

At step S206, information program 101 retrieves and displays a word list relative to the time at which the unknown verbal communication indication is received.

At decision step S208, information program 101 determines if a word is selected from the word list before a timeout is reached. In an embodiment, a timeout is initiated upon displaying a potential unknown word list to a user, in which the user has a predetermined amount of time in which to select a word from the potential unknown word list. If the user fails to select a word from a word list prior to reaching the timeout, the word list may, for example, be removed from the users view. If it is determined that a word is selected from the word list before reaching the time out (decision step S208 "YES" branch), information program 101 proceeds to step S210. If it is determined a word was not selected from word list before time out (decision step S208 "NO" branch), information program 101 continues to decision step S212.

At step S210, responsive to determining that a word was selected from word list prior to reaching the timeout, information program 101 displays additional word information associated with the selected word. For example, additional word information may include, but is not limited to, one or more of definitions, synonyms, and in the case of an unknown word being an acronym, the full written out version of the acronym.

At decision step S212, responsive to determining that a word was not selected from the word list prior to reaching the timeout, information program 101 determines if a request for additional words is received before reaching the timeout. If it is determined that a request for additional words was received before reaching the timeout (decision step S212 "YES" branch), information program 101 returns to step S206 and generates an updated word list. If it is determined that a word was not selected from the word list before reaching the timeout (decision step S212 "NO" branch), the process ends and information program 101 terminates.

Figure 3:
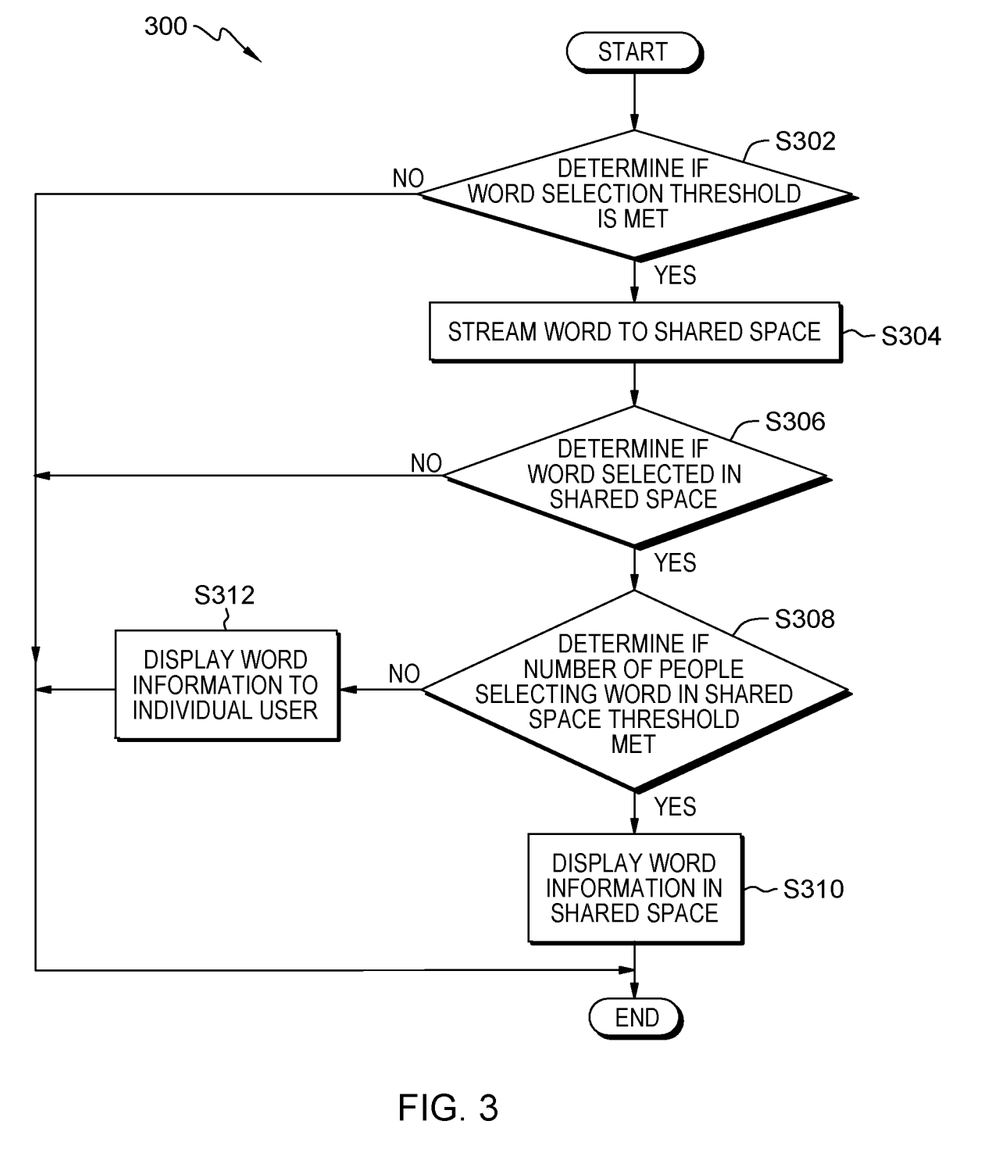
FIG. 3 is a flow chart diagram depicting operational steps for automatically streaming information related to unknown verbal communications to a shared space on a plurality of user devices in accordance with at least one embodiment of the present invention.

FIG. 3 is a flow chart diagram, generally designated 300, depicting operational steps for automatically streaming information related to unknown verbal communications to a shared user space on a plurality of user devices in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At decision step S302, information program 101 determines if a word selection threshold is met and/or exceeded. Here, information program 101 determines whether a predetermined number or percentage of users do not understand the same word or concept that was verbally communicated. In an embodiment, the word selection threshold is based on a predetermined number or percentage of users selecting the same word from respective word lists displayed on a plurality of user devices. In an embodiment, a word selection threshold is based on a predetermined number or percentage of users selecting the same word from respective word lists displayed on a plurality of user devices within a predetermined amount of time. If it is determined a word selection threshold is met and/or exceeded (decision step S302 "YES" branch), information program 101 proceeds to step S304. If it is determined a word selection threshold is not met and/or exceeded (decision step S302 "NO" branch), the process ends and information program 101 terminates.

At step S304, responsive to determining that a word selection threshold is met and/or exceeded, information program 101 streams the commonly selected unknown word to a shared user space of the respective user devices of those individuals attending or participating in an event, such as a meeting or presentation. In an embodiment, in addition to streaming the commonly selected unknown word to the shared user space, the commonly selected unknown word is also streamed to a presentation screen.

At decision step S306, information program 101 determines if a word streamed to the shared user space is selected. If it is determined that a word streamed to the shared user space is selected from the shared user space (decision step S306 "YES" branch), information program 101 proceeds to decision step S308. If it is determined that a word streamed to the shared user space is not selected from the shared user space (decision step S306 "NO" branch), the process ends and information program 101 terminates.

At decision step S308, information program 101 determines if a word selection threshold is met and/or exceeded for a word streamed to the shared user space. Here, information program 101 determines whether a predetermined number and/or percentage of users selected the same word from the shared user space. In an embodiment, the word selection threshold for a word streamed to the shared user space is based on a predetermined number or percentage of users selecting the same word from the shared user space. In an embodiment, the word selection threshold for a word streamed to the shared user space is based on a predetermined number or percentage of users selecting the same word from the shared user space within a predetermined amount of time. If it is determined that the word selection threshold is met and/or exceeded for a word streamed to the shared user space (decision step S308 "YES" branch), information program 101 proceeds to step S310. If it is determined a word selection threshold is not met and/or exceeded (decision step S308 "NO" branch), the process to step S312.

At step S310, responsive to determining that the word selection threshold is met and/or exceeded for a word streamed to the shared user space, information program 101 streams additional word information associated with the commonly selected unknown word to the shared user space.

At step S312, responsive to determining that the word selection threshold is not met and/or exceeded for a word streamed to the shared user space, information program 101 displays additional word information on respective user devices outside of the shared user space. In other words, information program 101 displays additional word information on those respective user devices in which the user selected a word from the shared user space.

Figure 4:
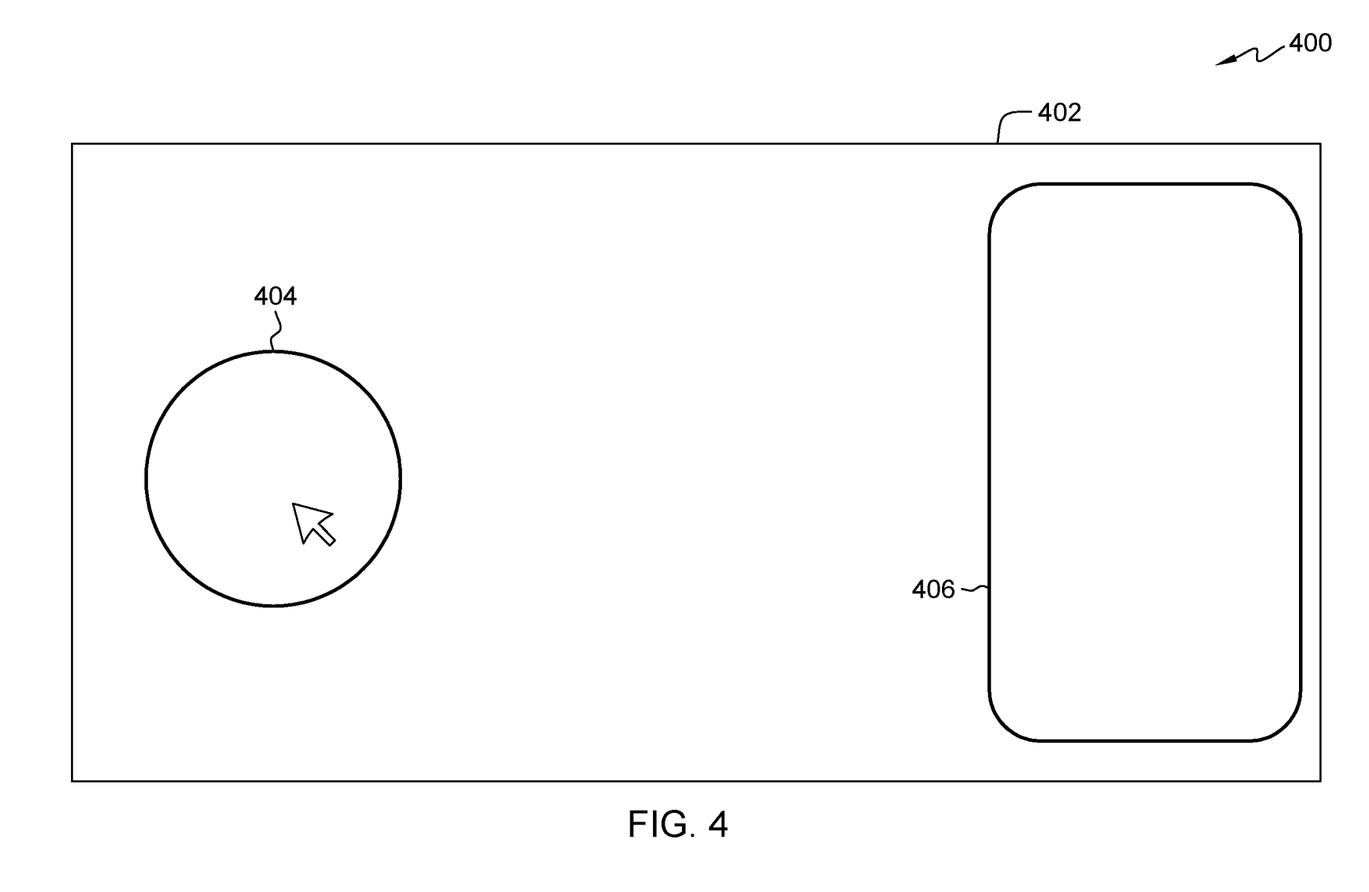
FIG. 4 illustrates an exemplary display screen of a user device, generally designated 400, in accordance with at least one embodiment of the present invention.

FIG. 4 illustrates an exemplary display screen of a user device, generally designated 400, in accordance with at least one embodiment of the present invention. For example, FIG. 4 is illustrative of a display screen 402 displaying application 114 running on user device 110. As depicted in FIG. 4, display screen 402 includes button 404 and shared user space 406. Button 404 can be selected by a user to indicate that they do not understand a verbal communication. Shared user space 406 is representative of an area designated on display screen 402 where common unknown or unfamiliar words selected by multiple users are streamed.

Figure 5:
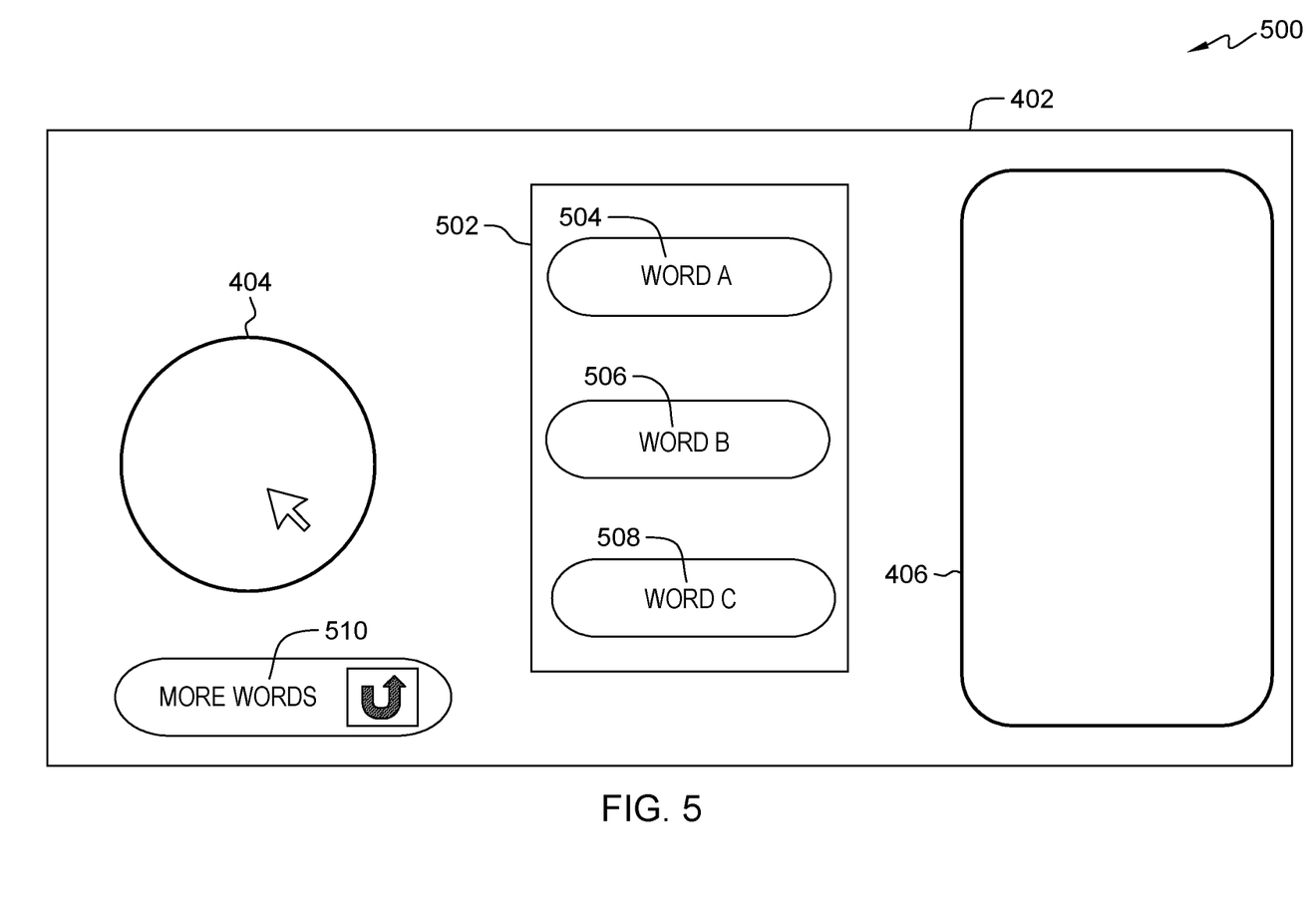
FIG. 5 illustrates an exemplary display screen of a user device, generally designated 500, displaying potential unknown verbal communications in accordance with at least one embodiment of the present invention.

FIG. 5 illustrates an exemplary display screen of a user device, generally designated 500, for displaying potential unknown verbal communications in accordance with at least one embodiment of the present invention. For example, FIG. 5 is illustrative of a display screen 402 displaying application 114 running on user device 110. As depicted in FIG. 5, display screen 402 includes button 404, shared user space 406, potential unknown word list 502, potential unknown words 504, 506, and 508, and more words button 510. In this exemplary embodiment, word list 502, including potential unknown words 504, 506, and 508, is displayed on display screen 402 in response to receiving a user indication (e.g., selection of button 402) of an unknown or unfamiliar verbal communication. In those instances where word list 502 does not include the unknown or unfamiliar word the user is looking for, the user can select more words button 510 to request an updated word list containing additional words associated with recent verbal communications. For example, unknown words 504, 506, and 508 may correspond to verbal communications made up to 5 seconds prior to the user selecting button 404. However, if none of these words are the unknown or unfamiliar word the user is looking for, the user may select more words button 510 to request additional words. In this example, an updated word list may be displayed to the user, including words that correspond to verbal communications made between 5 to 10 seconds prior to the user selecting button 404.

Figure 6:
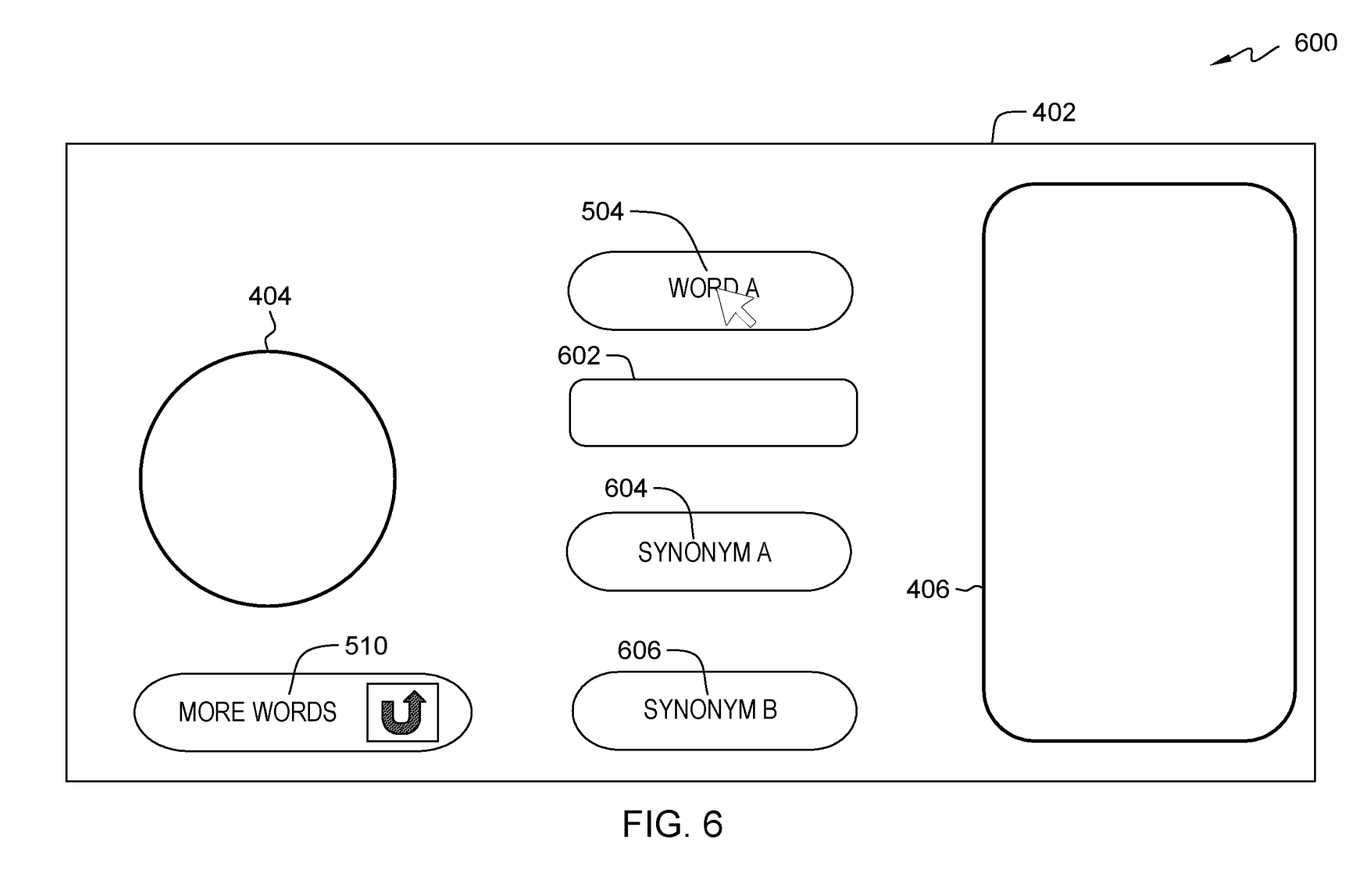
FIG. 6 illustrates an exemplary display screen, generally designated 600, displaying information related to potential unknown verbal communications in accordance with at least one embodiment of the present invention.

FIG. 6 illustrates an exemplary display screen of a user device, generally designated 600, displaying information related to potential unknown verbal communications in accordance with at least one embodiment of the present invention. For example, FIG. 6 is illustrative of a display screen 402 displaying application 114 running on user device 110. As depicted in FIG. 6, display screen 402 includes button 404, shared user space 406, potential unknown word 504, more words button 510, word information 602 and synonym words 604 and 606. In various embodiments, word information 602 includes any type of additional information associated with one or more words included in potential unknown word list 502. In this exemplary embodiment, word information 602 associated with potential unknown word 504 is displayed on display screen 402 in response to receiving a user selection of potential unknown word 504. If enough users select the same potential unknown word (e.g., potential unknown word 504) from their respective devices, the same potential unknown word may be streamed to shared user space 406 on all the respective devices of those individuals in attendance, irrespective of whether or not a particular user selected the potential unknown word.

Figure 7:
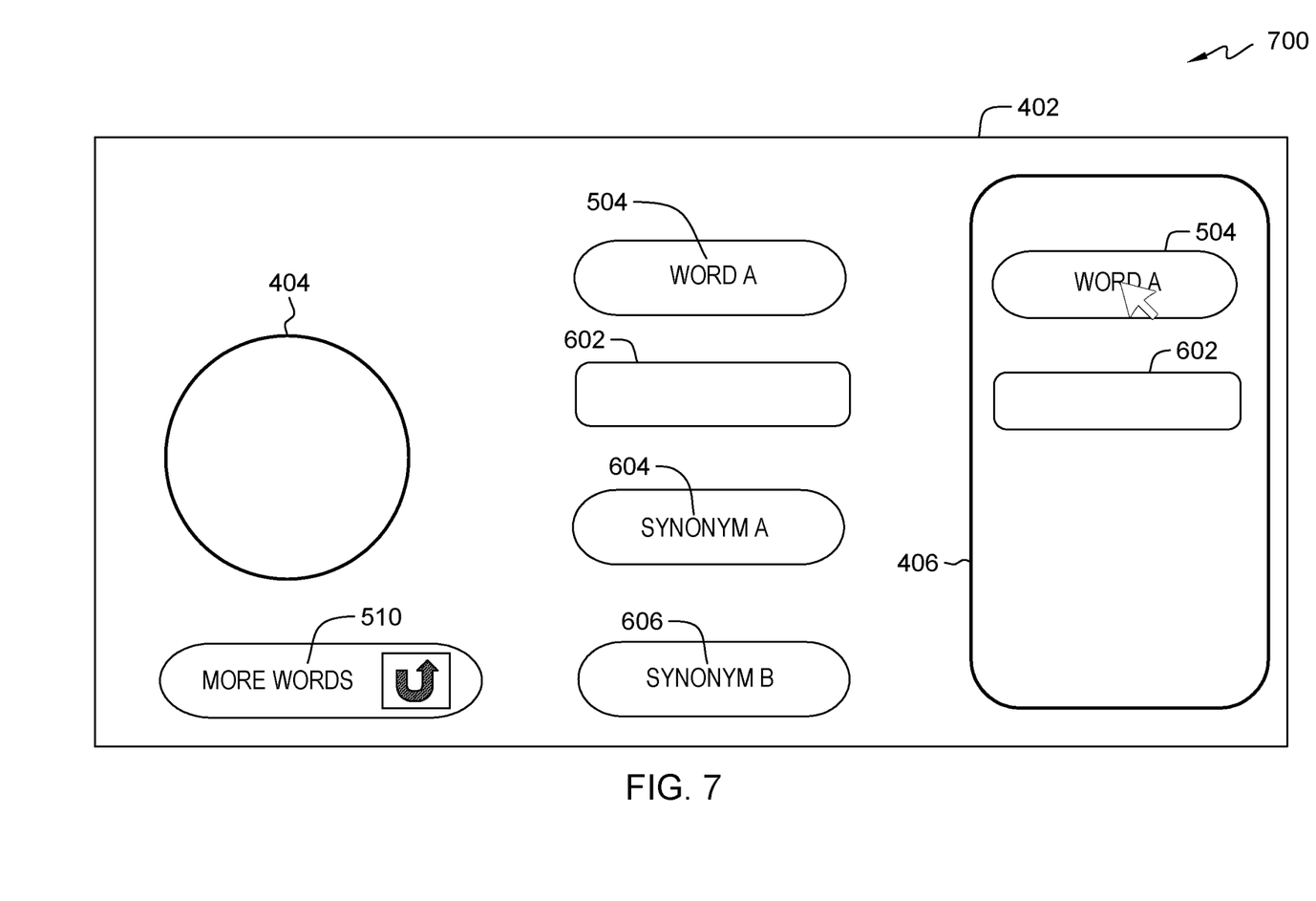
FIG. 7 illustrates an exemplary display screen of a user device, generally designated 700, displaying information related to a verbal communication streamed to a shared user space of a plurality of user devices in accordance with at least one embodiment of the present invention.

FIG. 7 illustrates an exemplary display screen of a user device, generally designated 700, displaying a verbal communication and information related to the verbal communication streamed to a shared user space of a plurality of user devices in accordance with at least one embodiment of the present invention. For example, FIG. 7 is illustrative of a display screen 402 displaying application 114 running on user device 110. As depicted in FIG. 7, display screen 402 includes button 404, shared user space 406, potential unknown word 504, more words button 510, word information 602, synonym words 604 and 606. In this exemplary embodiment, word information 602 associated with potential unknown word 504 is streamed to shared user space 404 in response to receiving a user selection of potential unknown word 502 located within shared user space 404. For example, if a user selects a potential unknown word (e.g., potential unknown word 502) from shared user space 404, additional information (e.g., word information 602) may be streamed to shared user space 404 on all the respective devices of those individuals in attendance, irrespective of whether or not a particular user selected the potential unknown word.

Figure 8:
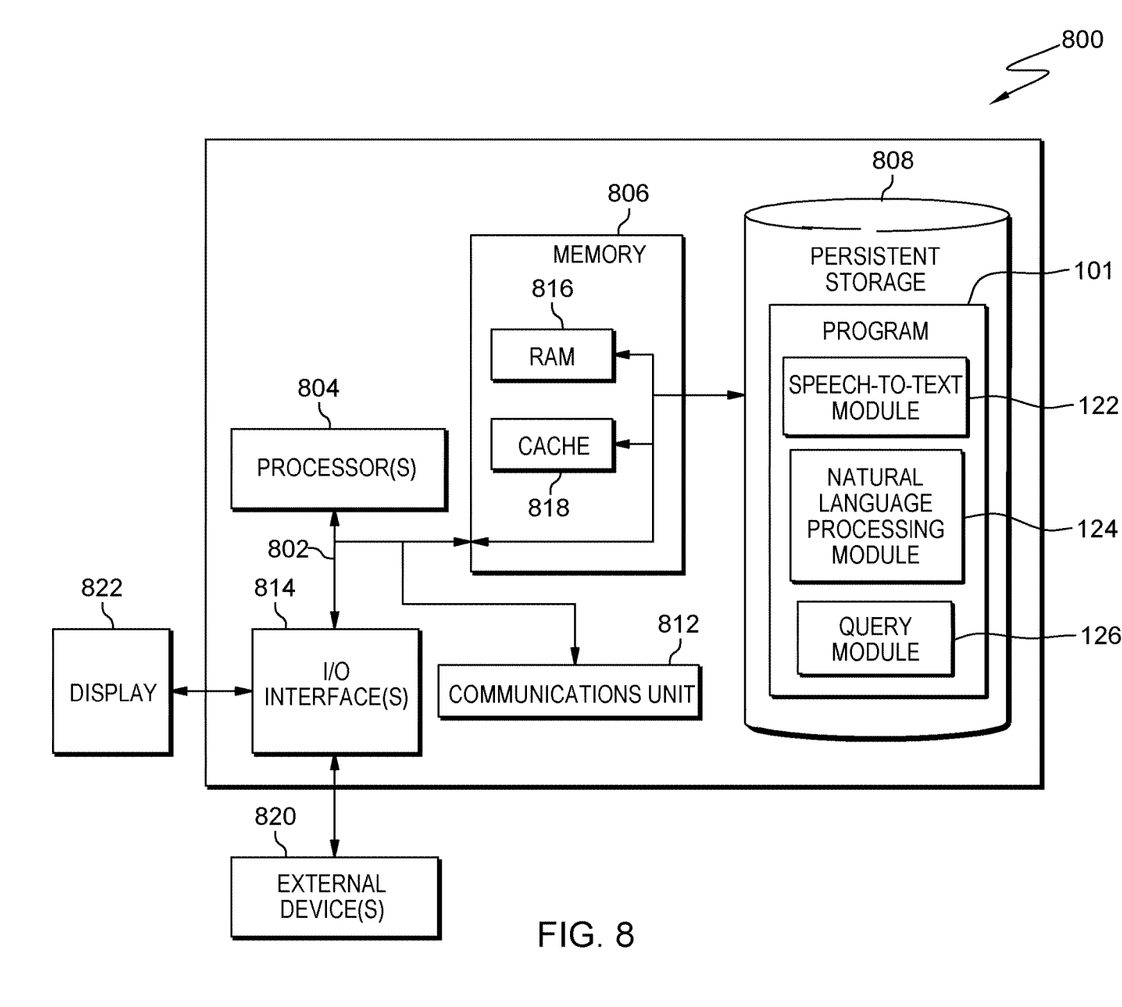
FIG. 8 is a block diagram depicting components of a computer, generally designated 800, suitable for executing an information program 101 in accordance with at least one embodiment of the present invention.

FIG. 8 is a block diagram depicting components of a computing device, generally designated 800, suitable for executing information program 101 in accordance with at least one embodiment of the invention. Computing device 800 includes one or more processor(s) 804 (including one or more computer processors), communications fabric 802, memory 806 including, RAM 816 and cache 818, persistent storage 808, which further includes information program 101, including natural language processing module 122, speech-to-text module 124, and query module 126, communications unit 812, I/O interface(s) 814, display 822, and external device(s) 820. It should be appreciated that FIG. 8 provides only an illustration of one embodiment and does not imply any limitations with regard to the environments in which different embodiments may be implemented. Many modifications to the depicted environment may be made.

As depicted, computing device 800 operates over communications fabric 802, which provides communications between computer processor(s) 804, memory 806, persistent storage 808, communications unit 812, and input/output (I/O) interface(s) 814. Communications fabric 802 can be implemented with any architecture suitable for passing data or control information between processor(s) 804 (e.g., microprocessors, communications processors, and network processors), memory 806, external device(s) 820, and any other hardware components within a system. For example, communications fabric 802 can be implemented with one or more buses.

Memory 806 and persistent storage 808 are computer readable storage media. In the depicted embodiment, memory 806 includes random-access memory (RAM) 816 and cache 818. In general, memory 806 can include any suitable volatile or non-volatile one or more computer readable storage media.

Program instructions for information program 101 can be stored in persistent storage 808, or more generally, any computer readable storage media, for execution by one or more of the respective computer processor(s) 804 via one or more memories of memory 806. Persistent storage 808 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 812, in these examples, provides for communications with other data processing systems or devices. In these examples, communications unit 812 can include one or more network interface cards. Communications unit 812 may provide communications through the use of either or both physical and wireless communications links. In the context of some embodiments of the present invention, the source of the various input data may be physically remote to computing device 800 such that the input data may be received, and the output similarly transmitted via communications unit 812.

I/O interface(s) 814 allows for input and output of data with other devices that may operate in conjunction with computing device 800. For example, I/O interface(s) 814 may provide a connection to external device(s) 820, which may be as a keyboard, keypad, a touch screen, or other suitable input devices. External device(s) 820 can also include portable computer readable storage media, for example thumb drives, portable optical or magnetic disks, and memory cards. Software and data used to practice embodiments of the present invention can be stored on such portable computer readable storage media and may be loaded onto persistent storage 808 via I/O interface(s) 814. I/O interface(s) 814 also can similarly connect to display 822. Display 822 provides a mechanism to display data to a user and may be, for example, a computer monitor.

What is claimed is:

1. A computer-implemented method for generating information associated with unknown verbal communications, comprising:
   receiving at least one indication of at least one unknown verbal communication from at least one user of a plurality of users;
   displaying a potential unknown word list to each device of the at least one user, wherein the potential unknown word list includes one or more words corresponding to verbal communications that occurred prior to receiving the at least one indication of the at least one unknown verbal communication;
   identifying that a word is selected from the potential unknown word list of a corresponding device of the at least one user;
   generating, in response to identifying that the word is selected from the potential unknown word list of the corresponding device, additional information associated with the selected word;
   determining that a number of users of the plurality of users above a predetermined threshold selected a same unknown word from their respective potential unknown word lists; and
   streaming, in response to determining that the number of users above the predetermined threshold selected the same unknown word from their respective potential unknown word lists, the same unknown word to a shared user space of each device of the plurality of users.

2. The computer-implemented method of claim 1, wherein the potential unknown word list includes the one or more words corresponding to verbal communications that occurred within a predetermined time period prior to receiving the user indication of the unknown verbal communication.

3. The computer-implemented method of claim 1, wherein the potential unknown word list includes a predetermined number of words corresponding to verbal communications that occurred prior to receiving the at least one indication of the at least one unknown verbal communication.

4. The computer-implemented method of claim 1, further comprising:
ordering the one or more words included in the potential unknown word list based on a likelihood of unfamiliarity of the one or more words with respect to the user.

5. The computer-implemented method of claim 4, wherein the likelihood of unfamiliarity of the one or more words with respect to the user is based, at least in part, on a number of times other users selected the one or more words from other potential unknown word lists.

6. The computer-implemented method of claim 4, wherein the likelihood of unfamiliarity of the one or more words with respect to the user is further based, at least in part, on:
comparing the one or more words corresponding to the verbal communications that occurred prior to receiving the user indication of the unknown verbal communication with words included in any presentation materials; and
identifying one or more words corresponding to the verbal communications that occurred prior to receiving the user indication that are not included in any of the presentation materials.

7. The computer-implemented method of claim 1, further comprising:
filtering the potential unknown word list to include only those words corresponding to verbal communications that have particular parts of speech.

8. The computer-implemented method of claim 1, further comprising:
determining that a threshold number of users selected the same unknown word from their respective potential unknown word lists; and
in response to determining that the threshold number of users selected the same unknown word from their respective potential unknown word lists:
sending a notification to a speaker of the unknown verbal communication.

9. The computer-implemented method of claim 8, further comprising:
determining that a threshold number of users selected the same unknown word from the shared user space of each device of the plurality of users; and
streaming, in response to determining that the threshold number of users selected the same unknown word from the shared user space of each device of the plurality of users, additional information associated with the same unknown word to the shared user space of each device of the plurality of users.

10. The computer-implemented method of claim 8, further comprising:
sending, in response to determining that the threshold number of users selected the same unknown word from the shared user space of each device of the plurality of users, a notification to a speaker;
determining that the speaker did not provide additional information with respect to the same unknown word after sending the notification to the speaker; and
preventing any presentation materials from advancing until additional information with respect to the same unknown word is detected from the speaker.

11. A computer program product for a user to generate information associated with unknown verbal communications, the computer program product comprising one or more computer readable storage media and program instructions stored on the one or more computer readable storage media, the program instructions including instructions to:
receive at least one indication of at least one unknown verbal communication from at least one user of a plurality of users;
display a potential unknown word list to each device of the at least one user, wherein the potential unknown word list includes one or more words corresponding to verbal communications that occurred prior to receiving the at least one indication of the at least one unknown verbal communication;
identify that a word is selected from the potential unknown word list of a corresponding device of the at least one user;
generate, in response to identifying that the word is selected from the potential unknown word list of the corresponding device, additional information associated with the selected word;
determine that a number of users of the plurality of users above a predetermined threshold selected a same unknown word from their respective potential unknown word lists; and
stream, in response to determining that the number of users above the predetermined threshold selected the same unknown word from their respective potential unknown word lists, the same unknown word to a shared user space of each device of the plurality of users.

12. The computer program product of claim 11, wherein the potential unknown word list includes the one or more words corresponding to verbal communications that occurred within a predetermined time period prior to receiving the user indication of the unknown verbal communication.

13. The computer program product of claim 11, wherein the potential unknown word list includes a predetermined number of words corresponding to verbal communications that occurred prior to receiving the at least one indication of the at least one unknown verbal communication.

14. The computer program product of claim 11, further comprising instructions to:
determine that a threshold number of users selected the same unknown word from their respective potential unknown word lists; and
stream, in response to determining that the threshold number of users selected the same unknown word from their respective potential unknown word lists, the same unknown word to a shared user space of each device of the plurality of users.

15. The computer program product of claim 11, further comprising instructions to:
determine that a threshold number of users selected the same unknown word from the shared user space of each device of the plurality of users; and
stream, in response to determining that the threshold number of users selected the same unknown word from the shared user space of each device of the plurality of users, additional information associated with the same unknown word to the shared user space of each device of the plurality of users.

16. A computer system for a user to generate information associated with unknown verbal communications, comprising:
- one or more computer processors;
- one or more computer readable storage media;
- computer program instructions;
- the computer program instructions being stored on the one or more computer readable storage media for execution by the one or more computer processors; and
- the computer program instructions including instructions to:
- receive at least one indication of at least one unknown verbal communication from at least one user of a plurality of users;
- display a potential unknown word list to each device of the at least one user, wherein the potential unknown word list includes one or more words corresponding to verbal communications that occurred prior to receiving the at least one indication of the at least one unknown verbal communication;
- identify that a word is selected from the potential unknown word list of a corresponding device of the at least one user;
- generate, in response to identifying that the word is selected from the potential unknown word list of the corresponding device, additional information associated with the selected word;
- determine that a number of users of the plurality of users above a predetermined threshold selected a same unknown word from their respective potential unknown word lists; and
- stream, in response to determining that the number of users above the predetermined threshold selected the same unknown word from their respective potential unknown word lists, the same unknown word to a shared user space of each device of the plurality of users.

17. The computer system of claim 16, wherein the potential unknown word list includes the one or more words corresponding to verbal communications that occurred within a predetermined time period prior to receiving the user indication of the unknown verbal communication.

18. The computer system of claim 16, wherein the potential unknown word list includes a predetermined number of words corresponding to verbal communications that occurred prior to receiving the at least one indication of the at least one unknown verbal communication.

19. The computer system of claim 16, further comprising instructions to:
- determine that a threshold number of users selected the same unknown word from their respective potential unknown word lists; and
- stream, in response to determining that the threshold number of users selected the same unknown word from their respective potential unknown word lists, the same unknown word to a shared user space of each device of the plurality of users.

* * * * *